United States Patent
Inaba

(10) Patent No.: US 7,369,384 B2
(45) Date of Patent: May 6, 2008

(54) REGULATOR AND ELECTRONIC APPARATUS THEREWITH

(75) Inventor: Katsumi Inaba, Tondabayashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/329,253

(22) Filed: Jan. 11, 2006

(65) Prior Publication Data
US 2006/0164770 A1 Jul. 27, 2006

(30) Foreign Application Priority Data
Jan. 26, 2005 (JP) ............................. 2005-017621

(51) Int. Cl.
*H02H 3/00* (2006.01)
*H02H 3/22* (2006.01)
(52) U.S. Cl. .................. 361/91.1; 361/90; 361/92; 361/56; 361/111
(58) Field of Classification Search ............... 361/91.1, 361/90, 92, 56, 111
See application file for complete search history.

(56) References Cited

U.S. PATENT DOCUMENTS 4,891,728 A * 1/1990 Preis et al. ................... 361/18
5,907,194 A * 5/1999 Schenk et al. ............. 307/10.1
6,481,814 B2 * 11/2002 DeMoor et al. ................ 347/5
2002/0118234 A1 8/2002 DeMoor et al.

FOREIGN PATENT DOCUMENTS

JP 11-289759 A 10/1999
JP 2005012958 * 1/2005

OTHER PUBLICATIONS

TDA 4718 Data Sheet, Siemens Semiconductor Group, May 1995, pp. 1-21.*

* cited by examiner

*Primary Examiner*—Michael Sherry
*Assistant Examiner*—Zeev Kitov
(74) *Attorney, Agent, or Firm*—Birch, Stewart, Kolasch & Birch, LLP

(57) ABSTRACT

To reduce the electric power wasted in an overvoltage protection circuit, a regulator IC 100 incorporates an overvoltage protection circuit 105 that stops the output operation of the regulator when the output voltage Vo becomes higher than a predetermined threshold voltage Vth1. The overvoltage protection circuit 105 includes switch means FET3 that turns on and off the overvoltage protection operation thereof according to a predetermined control signal.

6 Claims, 5 Drawing Sheets

REGULATOR AND ELECTRONIC APPARATUS THEREWITH

This nonprovisional application claims priority under 35 U.S.C. § 119(a) on Patent Application No. 2005-017621 filed in Japan on Jan. 26, 2005, the entire contents of which are hereby incorporated by reference.

BACKGROUND OF THE INVENTION

1. Field of the Invention

The present invention relates to a regulator incorporating an overvoltage protection circuit, and more particularly to a technique of reducing the electric power consumption thereof.

2. Description of Related Art

Conventionally, stabilized direct-current power supplies incorporate a regulator as means for yielding a constant output voltage without being influenced by the input voltage, the load current, the ambient temperature, etc. In particular, chopper-type regulators (switching regulators) that produce a constant output voltage by varying the duty of an output drive circuit offer the advantages of very low heat loss and efficient operation in cases where there is a great input-output voltage difference. Such regulators generally incorporate an overvoltage protection circuit (see, for example, Japanese Patent Application Laid-open No. 11-289759).

Certainly, with a conventional regulator incorporating an overvoltage protection circuit, when a voltage higher than the threshold value appears in the output stage, as when the load become open-circuited, the output operation of the regulator can be stopped. This helps prevent breakdown etc. of circuit elements due to overvoltage.

However, since the conventional regulator is so configured as to achieve overvoltage protection by constantly monitoring the output voltage without regard to whether it is in an operation-enabled or -disabled state or the state of the input and output voltages, it has the disadvantages of consuming unnecessary electric power in the overvoltage protection circuit. For example, in an overvoltage protection circuit that detects overvoltage based on the result of comparison between a division voltage obtained through resistor division of the output voltage and a predetermined reference voltage, electric power is lost by being steadily consumed by resistors, resulting in unnecessarily high electric power consumption. Thus, when the conventional regulator is adopted as a stabilized direct-current supply in a battery-operated electronic apparatus (such as a cellular phone), inconveniently, it tends to waste the electric power stored in the battery, unduly shortening the duration the electronic apparatus can be used.

SUMMARY OF THE INVENTION

In view of the conventionally experienced inconveniences discussed above, it is an object of the present invention to provide a regulator incorporating an overvoltage protection circuit that operates with reduced electric power consumption.

To achieve the above object, according to the present invention, in a regulator that produces a constant output voltage from an input voltage and that incorporates an overvoltage protection circuit that stops the output operation of the regulator when a voltage higher than a first threshold voltage appears, the overvoltage protection circuit includes switch means that turns on and off the overvoltage protection operation thereof according to a predetermined control signal. With this configuration, through the input of a proper control signal, it is possible to reduce the electric power wasted in the overvoltage protection circuit.

Moreover, according to the present invention, an electronic apparatus is provided with a battery that serves as an electric power source and a stabilized direct-current power supply that serves as means for converting the output of the battery. Adopted as the stabilized direct-current power supply here is the regulator described above. With this configuration, it is possible to prevent the electric power stored in the battery from being wasted in the overvoltage protection circuit, and thereby to lengthen the duration the electronic apparatus can be used.

DETAILED DESCRIPTION OF PREFERRED EMBODIMENTS

Figure 1A:
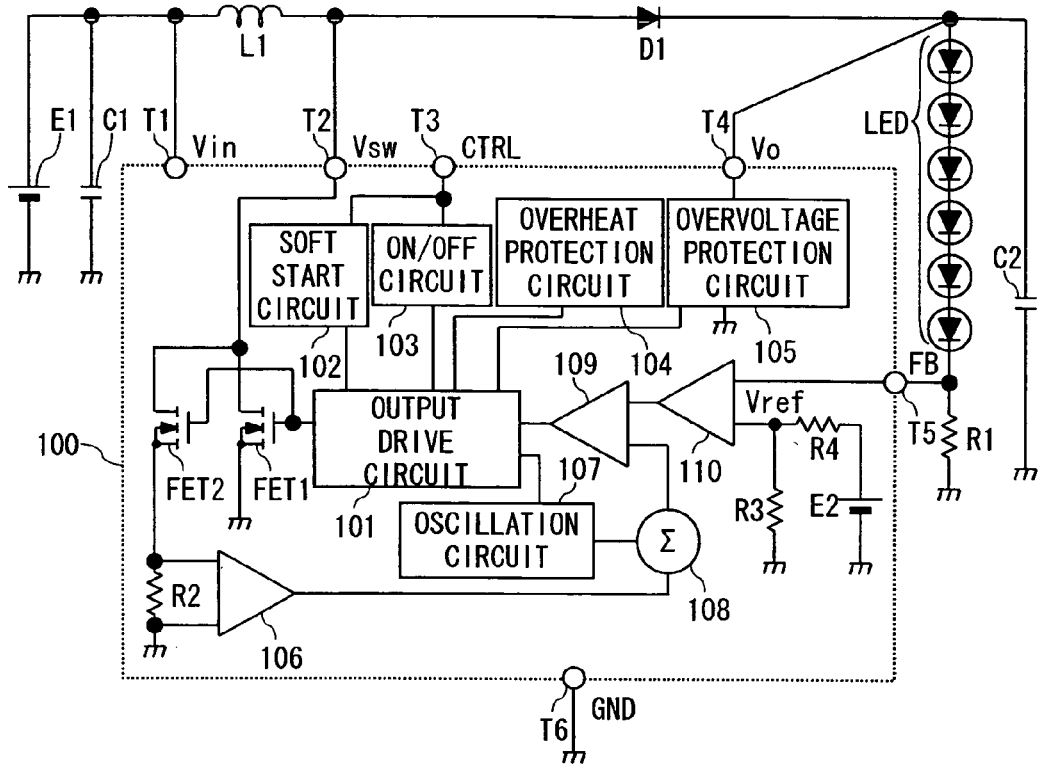
FIG. 1A is a circuit diagram showing the electronic apparatus of a first embodiment of the present invention.
Figure 1B:
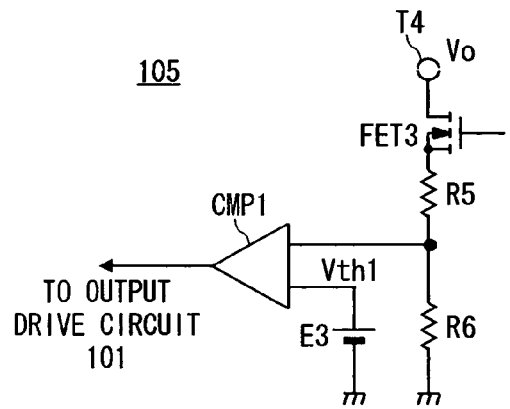
FIG. 1B is a circuit diagram showing an example of the configuration of the overvoltage protection circuit thereof.

First, the electronic apparatus of a first embodiment of the present invention will be described in detail with reference to FIGS. 1A and 1B. FIG. 1A is a circuit diagram showing the electronic apparatus of the first embodiment of the present invention, and FIG. 1B is a circuit diagram showing an example of the configuration of the overvoltage protection circuit thereof (each diagram partly presented as a block diagram). As shown in FIG. 1A, the electronic apparatus of this embodiment includes: a direct-current voltage source E1 (for example, a lithium-ion battery) as the electric power source of the electronic apparatus; a stabilized direct-current power supply (a regulator IC 100, smoothing capacitors C1 and C2, a coil L1, a diode D1, and a resistor R1) as means for converting the output of the direct-current voltage source E1; and a light-emitting diode array LED as a load. The electronic apparatus is, for example, a cellular phone.

The stabilized direct-current power supply mentioned above is configured as a step-up chopper-type regulator composed of, as already described, a regulator IC 100, smoothing capacitors C1 and C2, a coil L1, a diode D1, and a resistor R1.

The regulator IC 100 includes, as the circuit blocks incorporated therein, an output drive circuit 101, a soft start circuit 102, an on/off control circuit 103, an overheat protection circuit 104, an overvoltage protection circuit 105, an amplifier circuit 106, an oscillation circuit 107, an adder circuit 108, a PWM (pulse width modulation) comparator circuit 109, and an error amplifier circuit 110. The regulator IC 100 further includes: a P-channel field-effect transistor FET1 as means for controlling the output voltage; a P-channel field-effect transistor FET2 and a resistor R2 together as means for monitoring the output current; and a direct-current voltage source E2 and resistors R3 and R4 together as means for setting the output voltage. The regulator IC 100 has all the just-mentioned circuit blocks and components thereof packaged into a semiconductor integrated circuit device.

The regulator IC 100 also has: an external terminal T1 to which an input voltage Vin is applied; an external terminal T2 to which a switching pulse voltage $V_{SW}$ is applied; an external terminal T3 to which a drive control signal CTRL is applied; an external terminal T4 to which the output voltage Vo is applied; an external terminal T5 to which a voltage feedback signal FB is applied; and an external terminal T6 that is grounded to a reference potential (GND potential).

The positive end of the direct-current voltage source E1 is grounded via the smoothing capacitor C1, and is connected to one end of the coil L1 and to the external terminal T1 of the regulator IC 100. The negative end of the direct-current voltage source E1 is grounded. The other end of the coil L1 is connected to the anode of the diode D1 and to the external terminal T2 of the regulator IC 100. The cathode of the diode D1 is grounded via the smoothing capacitor C2, and is connected to the anode-side end of the light-emitting diode array LED and to the external terminal T4 of the regulator IC 100. The cathode-side end of the light-emitting diode array LED is grounded via the resistor R1, and is connected to the external terminal T5 of the regulator IC 100.

Inside the regulator IC 100, the sources of the transistors FET1 and FET2 are both connected to the external terminal T2, the drain of the transistor FET1 is directly grounded, and the drain of the transistor FET2 is grounded via the resistor R2. The gates of the transistors FET1 and FET2 are both connected to the gate signal output end of the output drive circuit 101. The backgates of the transistors FET1 and FET2 are connected to their respective drains. One end of the resistor R2 is connected to one input end of the amplifier circuit 106, and the other end of the resistor R2 is connected to the other input end of the amplifier circuit 106. One input end of the adder circuit 108 is connected to the output end of the amplifier circuit 106, and the other input end of the adder circuit 108 is connected to the output end of the oscillation circuit 107. One input end of the PWM comparator circuit 109 is connected to the output end of the adder circuit 108, and the other input end of the PWM comparator circuit 109 is connected to the output end of the error amplifier circuit 110. The output end of the PWM comparator circuit 109 is connected to the PWM pulse signal input end of the output drive circuit 101. One input end of the error amplifier circuit 110 is connected to the external terminal T5; the other input end of the error amplifier circuit 110 is grounded via the resistor R3, and is connected via the resistor R4 to the positive end of the direct-current voltage source E2. The negative end of the direct-current voltage source E2 is grounded.

In the regulator IC 100 configured as described above, the error amplifier circuit 110 amplifies the error voltage between the voltage feedback signal FB (a monitoring voltage that varies with the output voltage Vo) applied to the external terminal T5 and a predetermined reference voltage Vref (an output setting voltage that is produced by the direct-current voltage source E2 and the resistors R3 and R4), and then feeds the amplified error signal to the PWM comparator circuit 109. Thus, in this embodiment, the configuration is such that the voltage appearing at the node between the cathode-side end of the light-emitting diode array LED serving as the load and the resistor R1 is fed back. This configuration, unlike one in which a voltage obtained through resistor division of the output voltage Vo is fed back, permits proper output stabilization operation that is not affected by variation of the forward voltage drop VF across the light-emitting diode array LED.

The current that is diverted from the external terminal T2 to the transistor FET2 is converted by the resistor R2 into a voltage that serves as a current feedback signal (a monitoring voltage whose level varies with the output current). The amplifier circuit 106 amplifies this current feedback signal, and then feeds the amplified current feedback signal to the adder circuit 108. The adder circuit 108 adds together the current feedback signal amplified by the amplifier circuit 106 and a triangular wave signal produced by the oscillation circuit 107 to give the triangular wave signal an offset commensurate with the output current. Through this feedback control of the output current, the output current can be kept constant.

The PWM comparator circuit 109 compares the output signal of the error amplifier circuit 110 and the triangular wave signal from the adder circuit 108 to produce a PWM pulse signal, and feeds the produced PWM pulse signal to the output drive circuit 101. Thus, the ratio of the period during which the PWM pulse signal remains at logical high to the period during which it remains at logical low keeps varying according to the result of the comparison between the output signal of the error amplifier circuit 110 and the triangular wave signal.

According to the PWM pulse signal from the PWM comparator circuit 109, the output drive circuit 101 determines the output duty, and varies the on-state periods of the transistors FET1 and FET2 accordingly. Incidentally, when the transistor FET1 is on, the current from the direct-current voltage source E1 flows through the coil L1, and thus electrical energy is stored in the coil L1. On the other hand, when the transistor FET1 is off, the electrical energy stored in the coil L1 produces a back electromotive force in the coil L1. The back electromotive force produced in the coil L1 adds to the voltage of the direct-current voltage source E1, and the resulting sum voltage charges the smoothing capacitor C2 via the diode D1. These operations are repeated, so that the light-emitting diode array LED serving as the load is supplied with a direct-current output smoothed by the smoothing capacitor C2.

Parallel with the above sequence of operations, for the purpose of avoiding rush current at the startup of the regulator IC 100, according to the drive control signal applied to the external terminal T3, the soft start circuit 102 starts the output drive circuit 101 softly. Moreover, according to the drive control signal applied to the external terminal T3, the on/off control circuit 103 enables and disables the output drive circuit 101.

Moreover, the overheat protection circuit 104 enables and disables the output drive circuit 101 so that, when the chip temperature of the regulator IC 100 becomes higher than a threshold value, the output operation of the regulator IC 100 is stopped. Moreover, by monitoring the output voltage Vo applied to the external terminal T4, the overvoltage protection circuit 105 enables and disables the output drive circuit 101 so that, when a voltage higher than a threshold value appears in the output stage, as when the light-emitting diode array LED serving as the load becomes open-circuited, the output operation of the regulator IC 100 is stopped.

In this embodiment, as shown in FIG. 1B, the overvoltage protection circuit 105 includes: a comparator circuit CMP1, a direct-current voltage source E3, resistors R5 and R6, and a P-channel field-effect transistor FET3. The transistor FET3 serves as switch means for turning on and off the overvoltage protection operation of the overvoltage protection circuit 105 according to a predetermined control signal.

One input end of the comparator circuit CMP1 is connected to the positive end of the direct-current voltage source E3. The negative end of the direct-current voltage source E3 is grounded. The other input end of the comparator circuit CMP1 is connected via the resistor R5 to the drain of the transistor FET3, and is grounded via the resistor R6. The source of the transistor FET3 is connected to the external terminal T4. The backgate of the transistor FET3 is connected to the drain of the transistor FET3 itself. A predetermined control signal is applied to the gate of the transistor FET3.

In the overvoltage protection circuit 105 configured as described above, when the transistor FET3 is on, the comparator circuit CMP1 compares the output voltage Vo applied to the external terminal T4 with a first threshold voltage Vth1 (the voltage at the positive end of the direct-current voltage source E3), and enables and disables the output drive circuit 101 so that, if a voltage higher than the first threshold voltage Vth1 appears in the output voltage Vo, the output operation of the regulator IC 100 is stopped.

On the other hand, when the transistor FET3 is off, the monitoring of the output voltage Vo by the comparator circuit CMP1 is suspended, and the overvoltage protection operation of the overvoltage protection circuit 105 is kept off. In this state, the current path leading from the external terminal T4 through the resistors R5 and R6 to ground is cut off by the transistor FET3 in an off state, and therefore no electric power is lost in the resistors R5 and R6.

As described above, in this embodiment, the overvoltage protection circuit 105 includes switching means (the transistor FET3) that turns on and off the overvoltage protection operation thereof according to a predetermined control signal. With this configuration, through the input of a proper control signal to the switch means, it is possible to reduce the electric power wasted in the overvoltage protection circuit 105 (that is, the waste of the electric power of the direct-current voltage source E1, which is a battery), and thereby to lengthen the duration the electronic apparatus can be used.

Figure 2A:
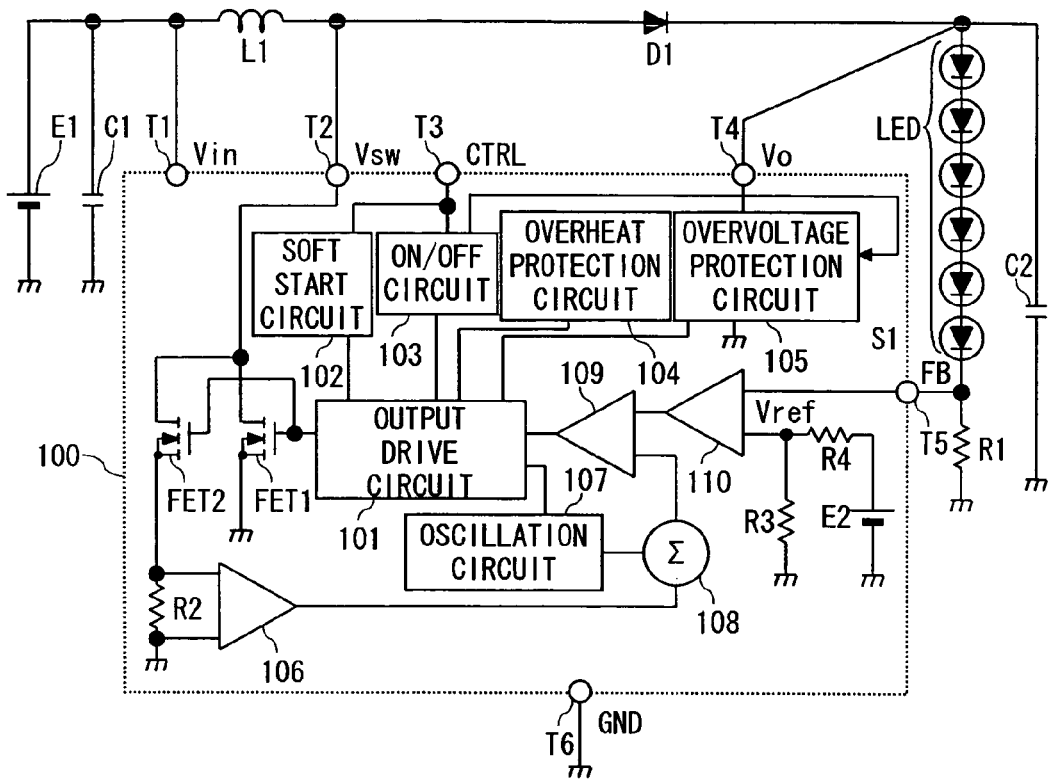
FIG. 2A is a circuit diagram showing the electronic apparatus of a second embodiment of the present invention.
Figure 2B:
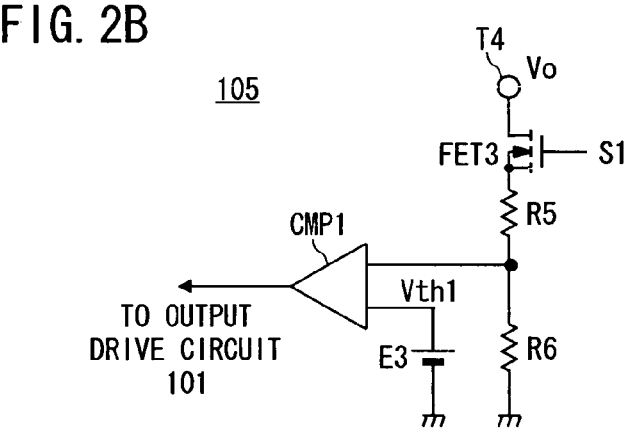
FIG. 2B is a circuit diagram showing an example of the configuration of the overvoltage protection circuit thereof.

Next, the electronic apparatus of a second embodiment of the present invention will be described in detail with reference to FIGS. 2A and 2B. FIG. 2A is a circuit diagram showing the electronic apparatus of the second embodiment of the present invention, and FIG. 2B is a circuit diagram showing an example of the configuration of the overvoltage protection circuit thereof (each diagram partly presented as a block diagram). As shown in FIGS. 2A and 2B, the electronic apparatus of this embodiment has largely the same configuration as the electronic apparatus of the first embodiment shown in FIGS. 1A and 1B described previously. Accordingly, such circuit blocks and components as find their counterparts in the first embodiment are identified with reference numerals and symbols common to FIGS. 1A and 1B, and no detailed explanations thereof will be repeated. Thus, the following description of this embodiment emphasizes the features unique thereto.

As shown in FIGS. 2A and 2B, in the regulator IC 100 of this embodiment, the on/off control circuit 103 enables and disables the output drive circuit 101 according to the drive control signal CTRL applied to the external terminal T3. In addition, the on/off control circuit 103 produces a control signal S1 to turn on and off the overvoltage protection operation of the overvoltage protection circuit 105 synchronously with the timing with which the output operation of the regulator IC 100 is turned on and off. The on/off control circuit 103 feeds the thus produced control signal S1 to the gate of the transistor FET3. With this configuration, when the output operation of the regulator IC 100 is turned off, the overvoltage protection operation is disabled from being unnecessarily continued. Thus, it is possible to reduce the electric power wasted in the overvoltage protection circuit 105 (that is, the waste of the electric power of the direct-current voltage source E1, which is a battery), and thereby to lengthen the duration the electronic apparatus can be used.

Figure 3A:
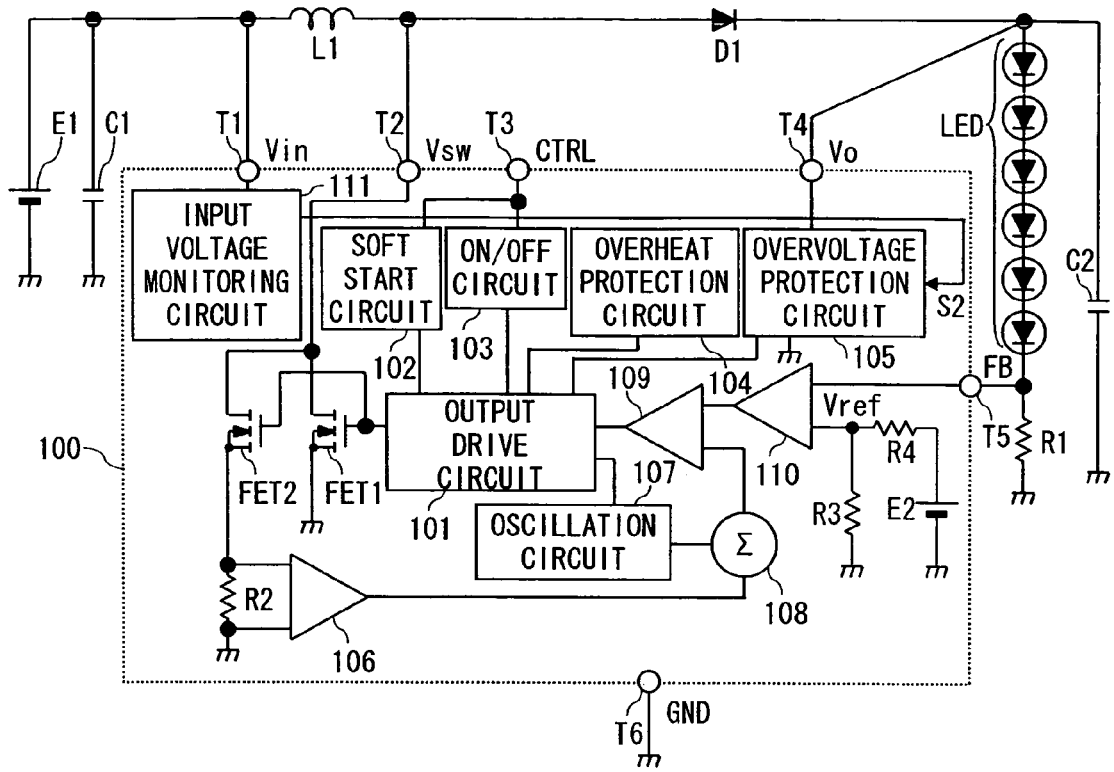
FIG. 3A is a circuit diagram showing the electronic apparatus of a third embodiment of the present invention.
Figure 3B:
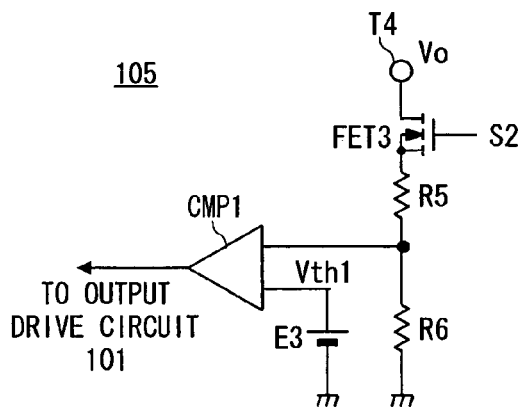
FIG. 3B is a circuit diagram showing an example of the configuration of the overvoltage protection circuit thereof.
Figure 3C:
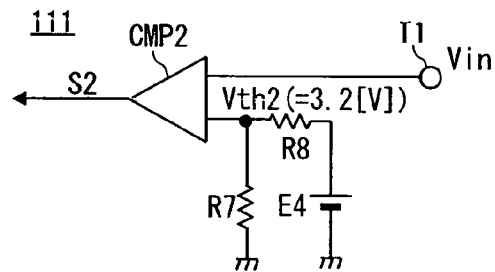
FIG. 3C is a circuit diagram showing an example of the configuration of the input voltage detection circuit thereof.

Next, the electronic apparatus of a third embodiment of the present invention will be described in detail with reference to FIGS. 3A to 3C. FIG. 3A is a circuit diagram showing the electronic apparatus of the third embodiment of the present invention, FIG. 3B is a circuit diagram showing an example of the configuration of the overvoltage protection circuit thereof, and FIG. 3C is a circuit diagram showing an example of the configuration of the input voltage monitoring circuit thereof (each diagram partly presented as a block diagram). As shown in FIGS. 3A to 3C, the electronic apparatus of this embodiment has largely the same configuration as the electronic apparatus of the first embodiment shown in FIGS. 1A and 1B described previously. Accordingly, such circuit blocks and components as find their counterparts in the first embodiment are identified with reference numerals and symbols common to FIGS. 1A and 1B, and no detailed explanations thereof will be repeated. Thus, the following description of this embodiment emphasizes the features unique thereto.

As shown in FIGS. 3A and 3B, the regulator IC 100 of this embodiment further includes, in addition to the circuit blocks and components already mentioned, an input voltage monitoring circuit 111. The input voltage monitoring circuit 111 produces a control signal S2 according to the result of monitoring of the input voltage Vin applied to the external terminal T1, and feeds the thus produced control signal S2 to the gate of transistor FET3.

As shown in FIG. 3C, the input voltage monitoring circuit 111 includes a comparator circuit CMP2, a direct-current voltage source E4, and resistors R7 and R8. One input end of the comparator circuit CMP2 is connected to the external terminal T1; the other input terminal of the comparator circuit CMP2 is grounded via the resistor R7, and is connected via the resistor R8 to the positive end of the direct-current voltage source E4. The negative end of the direct-current voltage source E4 is grounded. Thus, the input voltage monitoring circuit 111 produces the control signal S2 so that, when the input voltage Vin applied to the external terminal T1 is lower than a second threshold voltage Vth2 (a protection operation disabling voltage that is produced by the direct-current voltage source E4 and the resistors R7 and R8), the overvoltage protection operation of the overvoltage protection circuit 105 is turned off.

Incidentally, the second threshold voltage Vth2 can be set properly according to the mean voltage of the direct-current voltage source E1. For example, in a case where a lithium-ion battery is used as the direct-current voltage source E1, considering that its mean voltage is about 3.6 [V], the second threshold voltage Vth2 is set to be lower than that voltage, specifically about 3.2 [V].

With this configuration, whenever the input voltage Vin (that is, the electric power stored in the direct-current voltage source E1) lowers, and thus protection against overvoltage is found to be less necessary, the overvoltage protection operation can be disabled. Thus, it is possible to reduce the electric power wasted in the overvoltage protection circuit 105 (that is, the waste of the electric power of the direct-current voltage source E1, which is a battery), and thereby to lengthen the duration the electronic apparatus can be used.

Figure 4A:
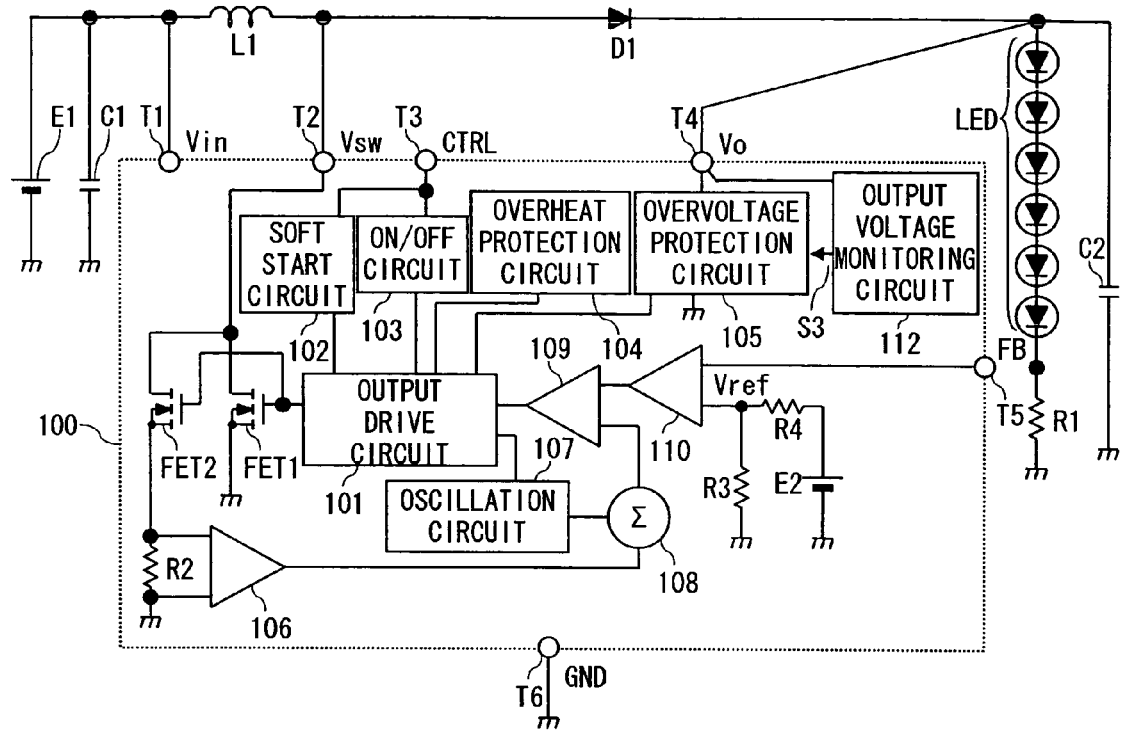
FIG. 4A is a circuit diagram showing the electronic apparatus of a fourth embodiment of the present invention.
Figure 4B:
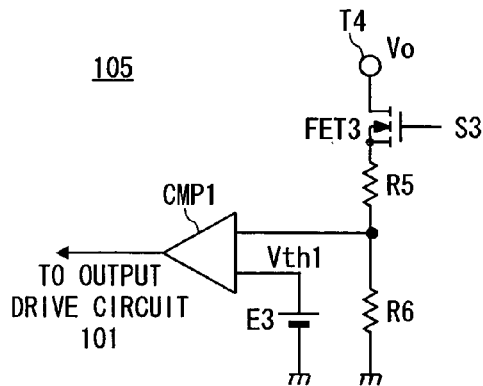
FIG. 4B is a circuit diagram showing an example of the configuration of the overvoltage protection circuit thereof.
Figure 4C:
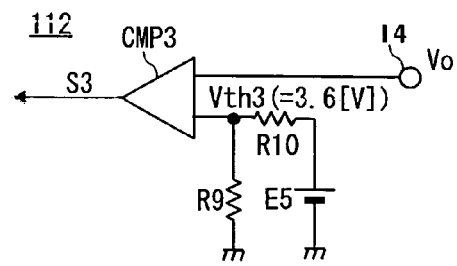
FIG. 4C is a circuit diagram showing an example of the configuration of the output voltage detection circuit thereof.

Next, the electronic apparatus of a fourth embodiment of the present invention will be described in detail with reference to FIGS. 4A to 4C. FIG. 4A is a circuit diagram showing the electronic apparatus of the fourth embodiment of the present invention, FIG. 4B is a circuit diagram showing an example of the configuration of the overvoltage protection circuit thereof, and FIG. 4C is a circuit diagram showing an example of the configuration of the input voltage monitoring circuit thereof (each diagram partly presented as a block diagram). As shown in FIGS. 4A to 4C, the electronic apparatus of this embodiment has largely the same configuration as the electronic apparatus of the first embodiment shown in FIGS. 1A and 1B described previously. Accordingly, such circuit blocks and components as find their counterparts in the first embodiment are identified with reference numerals and symbols common to FIGS. 1A and 1B, and no detailed explanations thereof will be repeated. Thus, the following description of this embodiment emphasizes the features unique thereto.

As shown in FIGS. 4A and 4B, the regulator IC 100 of this embodiment further includes, in addition to the circuit blocks and components already mentioned, an output voltage monitoring circuit 112. The output voltage monitoring circuit 112 produces a control signal S3 according to the result of monitoring of the output voltage Vo applied to the external terminal T4, and feeds the thus produced control signal S3 to the gate of transistor FET3.

As shown in FIG. 4C, the output voltage monitoring circuit 112 includes a comparator circuit CMP3, a direct-current voltage source E5, and resistors R9 and R10. One input end of the comparator circuit CMP3 is connected to the external terminal T4; the other input terminal of the comparator circuit CMP3 is grounded via the resistor R9, and is connected via the resistor R10 to the positive end of the direct-current voltage source E5. The negative end of the direct-current voltage source E5 is grounded. Thus, the output voltage monitoring circuit 112 produces the control signal S3 so that, when the output voltage Vo applied to the external terminal T4 is lower than a third threshold voltage Vth3 (a protection operation disabling voltage that is produced by the direct-current voltage source E5 and the resistors R9 and R10), the overvoltage protection operation of the overvoltage protection circuit 105 is turned off.

Incidentally, the third threshold voltage Vth3 can be set properly according to the mean voltage of the direct-current voltage source E1. For example, in a case where a lithium-ion battery is used as the direct-current voltage source E1, considering that its mean voltage is about 3.6 [V], the third threshold voltage Vth3 is set to be approximately equal to that voltage, specifically about 3.6 [V].

With this configuration, when the light emission operation of the light-emitting diode array LED serving as the load is turned off, the overvoltage protection operation is disabled from being unnecessarily continued. Thus, it is possible to reduce the electric power wasted in the overvoltage protection circuit 105 (that is, the waste of the electric power of the direct-current voltage source E1, which is a battery), and thereby to lengthen the duration the electronic apparatus can be used.

Figure 5A:
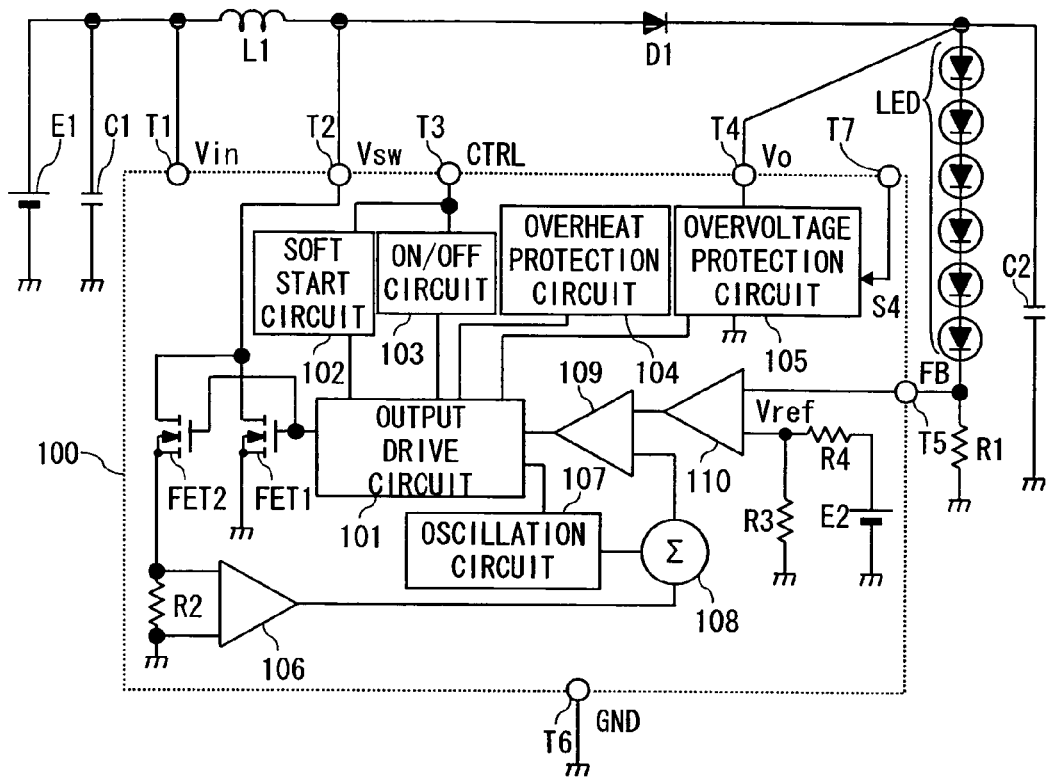
FIG. 5A is a circuit diagram showing the electronic apparatus of a fifth embodiment of the present invention.
Figure 5B:
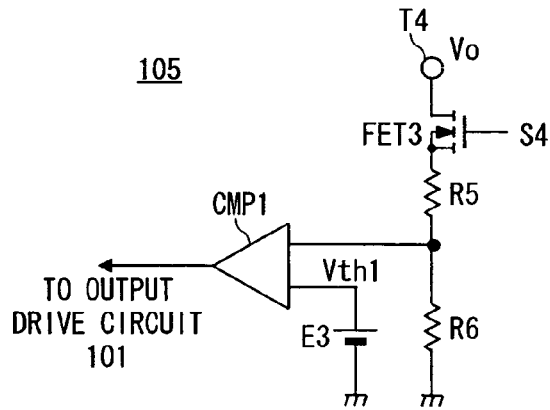
FIG. 5B is a circuit diagram showing an example of the configuration of the overvoltage protection circuit thereof.

Lastly, the electronic apparatus of a fifth embodiment of the present invention will be described in detail with reference to FIGS. 5A and 5B. FIG. 5A is a circuit diagram showing the electronic apparatus of the fifth embodiment of the present invention, and FIG. 5B is a circuit diagram showing an example of the configuration of the overvoltage protection circuit thereof (each diagram partly presented as a block diagram). As shown in FIGS. 5A and 5B, the electronic apparatus of this embodiment has largely the same configuration as the electronic apparatus of the first embodiment shown in FIGS. 1A and 1B described previously. Accordingly, such circuit blocks and components as find their counterparts in the first embodiment are identified with reference numerals and symbols common to FIGS. 1A and 1B, and no detailed explanations thereof will be repeated. Thus, the following description of this embodiment emphasizes the features unique thereto.

As shown in FIGS. 5A and 5B, the regulator IC 100 of this embodiment further includes, in addition to the circuit blocks and components already mentioned, an external terminal T7 for receiving, from outside the IC, a control signal S4 to be applied to the gate of the transistor FET3. With this configuration, through the input of a proper control signal S4 to the transistor FET3 from outside the IC, it is possible to reduce the electric power wasted in the overvoltage protection circuit 105 (that is, the waste of the electric power of the direct-current voltage source E1, which is a battery), and thereby to lengthen the duration the electronic apparatus can be used.

The embodiments described above all deal with cases where the present invention is applied to a step-up chopper type regulator. This, however, is not meant to limit the application of the present invention to such regulators. It should be understood that the present invention is applicable to regulators in general that produce a constant output voltage from an input voltage and that incorporate an overvoltage protection circuit that stops the output operation of the regulator when the output voltage becomes higher than a predetermined threshold voltage.

That is, the present invention is suitable in regulators in general that incorporate an overvoltage protection circuit, and particularly useful in reducing the electric power consumption thereof.

It should be understood that the present invention may be practiced in any manner other than specifically described as embodiments above, and many modifications and variations are possible within the spirit of the present invention.

What is claimed is:

1. A regulator producing a constant output voltage from an input voltage comprising:
    an input terminal receiving the input voltage;
    circuitry producing the constant output voltage from the input voltage;
    an output terminal to which the constant output voltage is applied;
    an on/off control circuit that turns the regulator on/off in response to an externally applied control signal; and
    an overvoltage protection circuit that stops output operation of the regulator when, while the constant output voltage is being produced from the input voltage, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, the switch means receives a predetermined control signal that turns on and off overvoltage protection operation of the overvoltage protection circuit, and the on/off control circuit produces the predetermined control signal for the switch means so that the overvoltage protection operation of the overvoltage protection circuit is turned on and off synchronously with timing with which the output operation of the regulator is turned on and off.

2. A regulator producing a constant output voltage from an input voltage comprising:

an input terminal receiving the input voltage;

circuitry producing the constant output voltage from the input voltage;

an output terminal to which the constant output voltage is applied;

an output voltage monitoring circuit that produces the control signal according to a result of monitoring of the output voltage which is applied to the output terminal; and an overvoltage protection circuit that stops output operation of the regulator when, while the constant output voltage is being produced from the input voltage, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, the switch means receives the control signal from the output voltage monitoring circuit that turns on and off overvoltage protection operation of the overvoltage protection circuit, and the output voltage monitoring circuit produces the control signal so that, when the output voltage is lower than a second threshold voltage, the overvoltage protection operation of the overvoltage protection circuit is turned off.

3. A regulator producing a constant output voltage from an input voltage comprising:

an input terminal receiving the input voltage;

circuitry producing the constant output voltage from the input voltage;

an output terminal to which the constant output voltage is applied;

an external terminal for receiving signals externally applied to the regulator from outside an apparatus; and an overvoltage protection circuit that stops output operation of the regulator when, while the constant output voltage is being produced from the input voltage, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, and the switch means receives from the external terminal a predetermined control signal that turns on and off overvoltage protection operation of the overvoltage protection circuit.

4. An electronic apparatus comprising:

a battery that serves as an electric power source; and a regulator that serves as means for converting an output voltage of the battery to a constant output voltage, wherein the regulator includes:

an input terminal receiving the output voltage of the battery;

circuitry producing the constant output voltage from the output voltage of the battery;

an output terminal to which the constant output voltage is applied;

an on/off control circuit that turns the regulator on/off in response to an externally applied control signal; and an overvoltage protection circuit that stops output operation of the regulator when, while the constant output voltage is being produced from the output voltage of the battery, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, the switch means receives a predetermined control signal that turns on and off overvoltage protection operation of the overvoltage protection circuit, and the on/off control circuit produces the predetermined control signal for the switch means so that the overvoltage protection operation of the overvoltage protection circuit is turned on and off synchronously with timing with which the output operation of the regulator is turned on and off.

5. An electronic apparatus comprising:

a battery that serves as an electric power source; and a regulator that serves as means for converting an output voltage of the battery to a constant output voltage, wherein the regulator includes:

an input terminal receiving the output voltage of the battery;

circuitry producing the constant output voltage from the output voltage of the battery;

an output terminal to which the constant output voltage is applied;

an output voltage monitoring circuit that produces the control signal according to a result of monitoring of the output voltage; and an overvoltage protection circuit that stops output operation of the regulator when, while the constant output voltage is being produced from the output voltage of the battery, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, the switch means receives the control signal from the output voltage monitoring circuit that turns on and off overvoltage protection operation of the overvoltage protection circuit, and the output voltage monitoring circuit produces the control signal so that, when the output voltage is lower than a second voltage, the overvoltage protection operation of the overvoltage protection circuit is turned off.

6. An electronic apparatus comprising:

a battery that serves as an electric power source; and a regulator that serves as means for converting an output voltage of the battery to a constant output voltage, wherein the regulator includes:

an input terminal receiving the output voltage of the battery;

circuitry producing the constant output voltage from the output voltage of the battery;

an output terminal to which the constant output voltage is applied;

an external terminal for receiving signals externally applied to the regulator from outside an apparatus; and an overvoltage protection circuit that stops output operation of the regulator when, while the constant output voltage is being produced from the input voltage, a voltage higher than a first threshold voltage appears in the output voltage, wherein the overvoltage protection circuit includes a comparator and a switch means, the comparator receives the first threshold voltage at a first input, the switch means is connected between the output terminal of the regulator and a second input of the comparator, the comparator compares an output of the switch means with the first threshold voltage, and the switch means receives from the external terminal a predetermined control signal that turns on and off overvoltage protection operation of the overvoltage protection circuit.

* * * * *